(12) United States Patent
Tsuchida et al.

(10) Patent No.: US 8,827,560 B2
(45) Date of Patent: Sep. 9, 2014

(54) SLIDE DEVICE

(75) Inventors: You Tsuchida, Kanagawa (JP); Hiroshi Nishizawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/634,267

(22) PCT Filed: May 30, 2011

(86) PCT No.: PCT/JP2011/062386
§ 371 (c)(1),
(2), (4) Date: Sep. 12, 2012

(87) PCT Pub. No.: WO2011/152355
PCT Pub. Date: Dec. 8, 2011

(65) Prior Publication Data
US 2012/0328223 A1  Dec. 27, 2012

(30) Foreign Application Priority Data

Jun. 1, 2010  (JP) .................................. 2010-126012

(51) Int. Cl.
*F16C 29/04* (2006.01)

(52) U.S. Cl.
CPC .............. *F16C 29/04* (2013.01); *F16C 2226/52* (2013.01); *F16C 2326/02* (2013.01); *F16C 2361/31* (2013.01)
USPC ................................ 384/58; 384/59; 384/449

(58) Field of Classification Search
USPC ........................... 384/58, 19, 50, 59, 449, 537
See application file for complete search history.

(56) References Cited

U.S. PATENT DOCUMENTS

| | | | | |
|---|---|---|---|---|
| 3,950,046 A | * | 4/1976 | Lubbersmeyer | 384/546 |
| 4,887,915 A | * | 12/1989 | Forster | 384/57 |
| 4,914,712 A | * | 4/1990 | Ikimi et al. | 384/449 |
| 5,566,623 A | | 10/1996 | Wareham | |
| 5,820,269 A | * | 10/1998 | Ariga | 384/53 |
| 6,971,801 B2 | * | 12/2005 | Miyazaki et al. | 384/504 |

FOREIGN PATENT DOCUMENTS

| | | |
|---|---|---|
| CH | 673137 A5 | 2/1990 |
| GB | 2 223 066 A | 3/1990 |
| JP | 44-5475 A | 2/1969 |
| JP | 8-232952 A | 9/1996 |
| JP | 11-37154 A | 2/1999 |
| JP | 2002-89577 A | 3/2002 |
| JP | 3419053 B2 | 6/2003 |
| JP | 2006-322579 A | 11/2006 |
| JP | 2007-331457 A | 12/2007 |
| WO | 2007/063055 A1 | 6/2007 |

OTHER PUBLICATIONS

Written Opinion (PCT/ISA/237), dated Aug. 30, 2011, issued by the International Searching Authority in corresponding International Application No. PCT/JP2011/062386.

(Continued)

*Primary Examiner* — Thomas R Hannon
(74) *Attorney, Agent, or Firm* — Sughrue Mion, PLLC

(57) ABSTRACT

A shaft, which supports an inner ring of a bearing and is integrally attached to a linear motion type slider, has a through hole in a center portion thereof. Since correction of the shaft may be performed by grasping a separate shaft to be inserted to the through hole, the shaft is not scratched. Additionally, even after press fitting the bearing, the posture may be corrected without grasping the bearing.

7 Claims, 10 Drawing Sheets

ENLARGED VIEW OF C PORTION

(56) References Cited

OTHER PUBLICATIONS

International Search Report (PCT/ISA/210), dated Aug. 30, 2011, issued by the International Searching Authority in corresponding International Application No. PCT/JP2011/062386.

Office Action issued by the State Intellectual Property Office of the People's Republic of China dated May 29, 2013 in corresponding Application No. 201180001562.2.

Extended European Search Report, dated for Jan. 14, 2014, issued by the European Patent Office in counterpart European Application No. 11789758.7.

* cited by examiner

ENLARGED VIEW OF C PORTION

SLIDE DEVICE

TECHNICAL FIELD

The present invention relates to a slide device capable of a linear motion with a lower load and higher precision using a ball bearing, and, more specifically to a slider of the slide device.

BACKGROUND ART

In the prior art, as this type of slide device, a device called a linear guide or the like using a ball for rolling elements is well known. Also, a device called a cross-roller guide using a roller, instead of ball, for the rolling elements in order to support a higher load is known. In addition, Patent Document 1 discloses that a power transmission section is arranged at an identical frame for a linear guide using a slider which has a plurality of ball bearings, thereby realizing miniaturization, and guiding is possible in four directions without any adjustment even with the precision of an aluminum sash frame by using a set of three ball bearings in the frame.

In addition, Patent Document 2 discloses that a low cost linear guide device may be provided without decreasing precision by providing a roller of resin or the like around the outer ring of ball bearing and arranging the roller between the corresponding slider and the ball bearing so that approximately half of the ball bearings are in contact with each of the left and right raceway surfaces of a rail in a longitudinal direction of the rail.

CITATION LIST

Patent Document

[Patent Document 1] JP-A-11-37154 (Page 3, [0010], FIG. 1 and FIG. 3)
[Patent Document 2] JP-A-8-232952 (Page 3, [0007], FIG. 2 and FIG. 3)

SUMMARY OF INVENTION

Technical Problem

However, such a guide device needs to allow an outer ring of the bearing to precisely correspond to a traveling surface of the rail. Thus, a shaft or a slider fixing an inner ring of the bearing needs to be processed with a high precision and the precision when attaching the shaft to the slider needs to be sufficiently high. For that reason, increased costs, complicated assembly or increased inspection efforts in parts processing are difficult to suppress.

Furthermore, when the shaft is corrected after being fixed to the slider, an outer diameter portion of the shaft needs to be clamped steadily. The outer diameter portion thereof, in order to correspond to an inner ring of the bearing, needs sufficient free of scratches or the like. If the outer diameter of the shaft is scratched, press fitting into the inner ring of the bearing becomes difficult or in some cases, this causes deformation of the inner ring to occur. In addition, in the same manner, scratching of the shaft becomes a serious problem when the shaft and the bearing are in a process of transition fitting or clearance fitting. In regard to scratching of the shaft, the influence of protrusion in the periphery of a recessed portion is more often a problem than the recessed portion is. Therefore, when the outer diameter of the shaft is scratched, the shaft shall replace or the whole slider is subject to disposal, which causes an increased cost. In addition, after mounting the bearing on the shaft by press fitting or clearance fitting, when correcting an inclination of the shaft, that is, the inclination of the bearing as a result, it is necessary to directly chuck the bearing except when the length of extension of the shaft from the bearing is long. When the length of the shaft is long, this causes the miniaturization of the slide device to be inhibited. When directly chucking the bearing, a stress is applied to the bearing and due to the occurrence of a Brinell impression on the raceway groove, there is a possibility that degradation of quality such as variation of torque and acoustic noise will occur.

On the other hand, in a guide device disclosed in PTL 2, a bearing is fixed, use caulking method, to a plate of a slider at a stepped shaft which has a flange. In addition, it is also disclosed that in order to free from protrusion of the caulking of the shaft, the caulking portion of the plate is recessed. In order to correct an inclination of the shaft or the like after caulking, it is necessary to chack resins or rubbers formed by bonding, press fitting or insert molding around the bearing. These materials are soft and subject to elastic deformation. Thus, it is difficult to correct an inclination of the shaft, which also causes problems such as easy occurrence of scratching on the resin or rubber of the outer peripheral portion.

In addition, in these guide devices, the shaft and an inner ring of the bearing provided in the slider are fixed by press fitting or the like, and as the shaft, a straight shape is used. Dimension relations between the shaft and the inner ring are set in consideration of remove force, a radial clearance of the bearing or the like with respect to interference fitting, as a press fitting. In a slider assembly, by press fitting the bearing to the shaft, an inner diameter of the inner ring of the bearing increases and the radial clearance decreases. In addition, after fitting the shaft to the inner ring, by caulking the shaft, the diameter of the shaft is increased slightly, this so-called shaft widening causes the radial clearance to decrease or be absent and thereby a rotational torque of the bearing becomes heavier and/or unsmooth, which also results in a shorter life.

Therefore, it is important to pay sufficient attention to the management of the interference fitting or the radial clearance and its tolerance. For example, a case of press fitting a straight shaft to the inner ring is considered. The rigidity of a portion which has a raceway groove of the inner ring is lower, compared with a portion without the raceway groove. This is because the portion with the raceway groove has a different outer diameter from the portion without the raceway groove, with respect to the inner diameter of the inner ring. This is applicable to a case when considering a circular press fitting which press fits a straight shaft with respect to a ring which has a partially different outer diameter. The rigidity of the inner ring varies according to shapes of the raceway grooves or the thicknesses of the inner rings. Accordingly, if the straight shaft is press fitted, as a result, deformation of the raceway groove occurs. The deformation of the raceway groove is considered to be a bearing of degraded precision. Fluctuations of rotational torque and/or radial clearance, and as a result, this causes decreased precision or decreased reliability of the slide device.

The present invention is intended to solve the above described problems in the related art. A first object is to provide a slide device which prevents influence to the outer diameter of the shaft to which a bearing is mounted, in which correction of an inclination of the shaft is made easy, and which has good precision performance and is low cost. In addition, a second object is to provide a slide device in which the management of interference fitting in the related art is easy, and which reduces fluctuations of radial clearances decreased by a press fitting or fluctuations of raceway grooves, which prevents an increase of bearing torque and which has excellent precision and high reliability.

Means for Solving the Problem

A first aspect of the invention, in order to achieve the first object, there is provided a slide device including: a rail whose cross-section is substantially C-shaped; and a bearing arranged to face an inner wall plane of the rail and configured such that an outer ring of the bearing is rotated, wherein the rail guides a slider supporting an inner ring of the bearing such that the slider is moved linearly, and wherein a shaft of the slider is configured to support the inner ring of the bearing and is formed integrally with the slider, and a through hole is formed in a center of the shaft. According to this configuration, another shaft is inserted to the through hole and the shaft is used, whereby without chucking an outer diameter of the shaft of the slider, the shaft may be substantially chucked.

In addition, a bottom portion of the shaft close to the slider is easily subject to a plastic deformation. According to this configuration, when an external force is applied with respect to the shaft and an inclination of the shaft is corrected, the bottom portion is easily subject to the plastic deformation. Accordingly, occurrence of deformation or strain on a portion of the shaft subjected to press fitting to the inner ring of the bearing may be decreased. Furthermore, the inclination may be easily corrected, thereby influence with respect to the other portion of the slider may be reduced and influence by work or handling may be reduced.

In addition, rigidity of the shaft is lower than that of the inner ring of the bearing in a radial direction so as to prevent deformation of a raceway groove of the inner ring into which the shaft is press fitted. According to configuration, when the inner ring of the bearing is press fitted to the shaft, even when an outer diameter precision of the shaft is lower, compared to an inner diameter precision of the inner ring of the bearing, the shaft is easily subject to deformation compared to the inner ring of the bearing. Thus, the deformation of the inner ring of the bearing may be reliably reduced. For this reason, the deformation of the raceway groove of the inner ring of the bearing may be reduced, the management of the interference fitting may be easily performed, and the fluctuations of the radial clearance decreasing due to the press fitting may be reduced. Accordingly, the reduction in the bearing torque or the rotation precision may be prevented, whereby the slide device with high precision may be realized.

In addition, the shaft is formed by press working the slider. According to this configuration, it is unnecessary to separately produce the shaft, and fixed work such as caulking or press fitting to attach the shaft to the slider may not be necessary. In addition, since the number of parts may be reduced, improved reliability and reduced management effort may be realized. Furthermore, it is also possible to produce the slider using a press work method.

A second aspect of the invention, in order to achieve the second object, there is provided a slide device including: a rail whose cross-section is substantially C-shaped; and a bearing arranged to face an inner wall plane of the rail and configured such that on outer ring of the bearing is rotated. The inner wall plane of the rail guides a slider supporting an inner ring of the bearing such that the slider is moved linearly, and a shaft of the slider is configured to support the inner ring of the bearing, and rigidity of a portion of the shaft facing a raceway groove of the inner ring of the bearing is reduced. According to this configuration, a deformation of the raceway groove of the inner ring of the bearing may be reduced due to the shaft retaining the inner ring of the bearing. For this reason, an increase of the bearing torque may be prevented and a slide device with high reliability may be provided.

In the shaft, a portion of the shaft corresponding to the raceway groove of the inner ring is slimmed according to this configuration, the deformation of the raceway groove of the inner ring of the bearing may be reduced by the shaft which retains the inner ring of the bearing. With this configuration, the increase in the bearing torque may be prevented and the slide device with high reliability may be provided.

In addition, a recess is formed in a portion of the shaft facing the raceway groove of the inner ring of the bearing, and the recess is not in contact with the raceway groove. According to this configuration, the deformation of the raceway groove of the inner ring of the bearing and the increase in torque may be reliably prevented, and the slide device with high reliability may be provided.

In addition, a width of the recess or a thickness of the slimmed portion of the shaft is equal to or wider than a width of the raceway groove of the inner ring of the bearing. According to this configuration, the deformation of the raceway groove of the inner ring of the bearing and the increase in torque may be reliably prevented, and the slide device with high reliability may be provided.

Advantageous Effects of Invention

As described above, according to the first aspect of the invention, by arranging a through hole to a shaft of a slider mounting a bearing, when the inclination of the shaft or the like is corrected, another shaft is inserted to the through hole and the shaft is used, whereby the shaft may be substantially retained without chucking an outer diameter of the shaft of the slider. Owing to this, correction may be performed without scratching the outer diameter of the shaft, and a slide device with low cost and high reliability may be realized.

In addition, even after the bearing is assembled in the shaft, correction of an inclination of the shaft may be performed without chucking the bearing.

In addition, according to the second aspect of the invention, in the shaft of the slider mounting an inner ring of the bearing, the rigidity of a portion corresponding to a raceway groove of the inner ring of the bearing is reduced, whereby a deformation of the raceway groove of the inner ring of the bearing may be reduced, the management of interference fitting is made easy, an increase in load may be prevented and a slide device with high reliability may be realized.

DESCRIPTION OF EMBODIMENTS

First Embodiment

Figure 1:
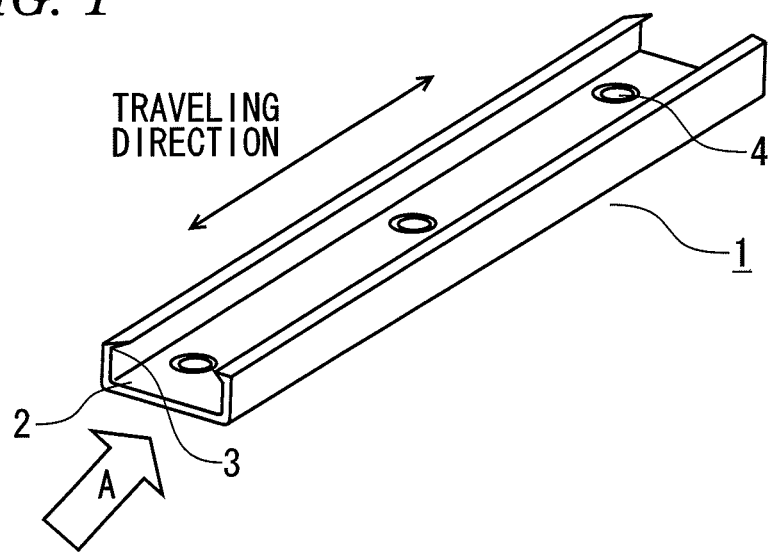
FIG. 1 is a perspective view illustrating a rail of a slide device according to a first embodiment of the present invention.
Figure 2:
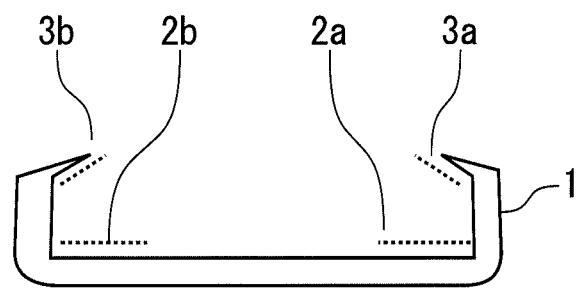
FIG. 2 is a side view of a rail according to a first embodiment of the present invention.
Figure 3:
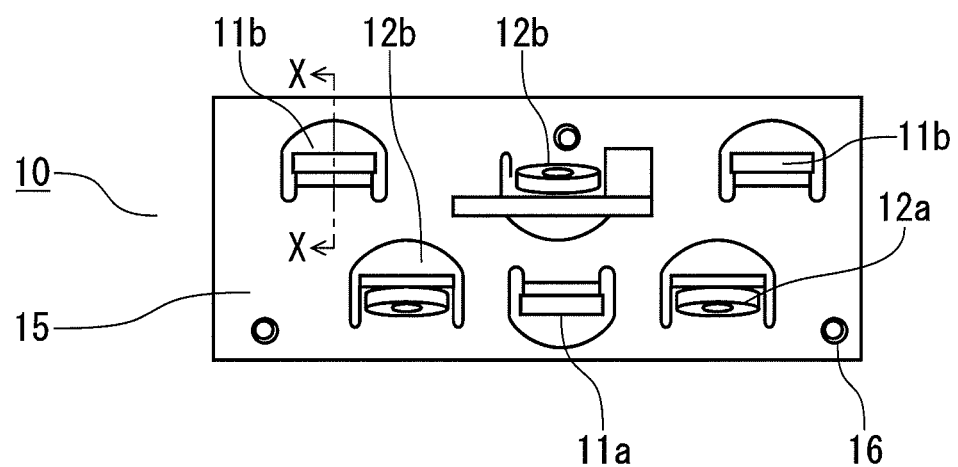
FIG. 3 is a plan view of a slider according to a first embodiment of the present invention.
Figure 4:
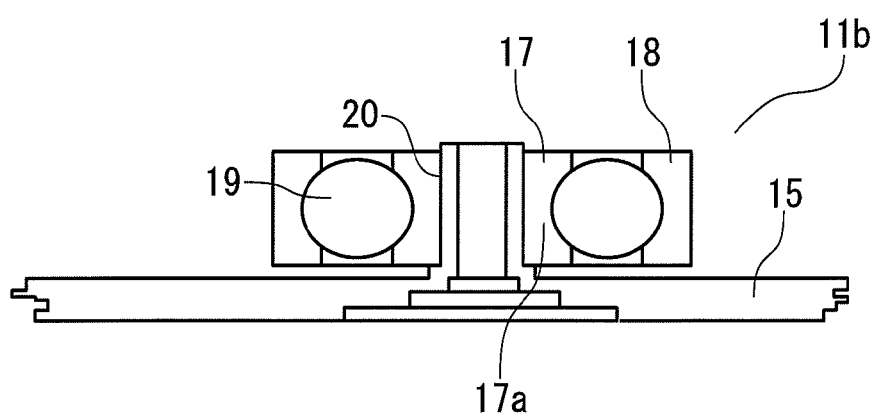
FIG. 4 is a cross sectional view taken along an X-X line of a slider in FIG. 3.
Figure 5:
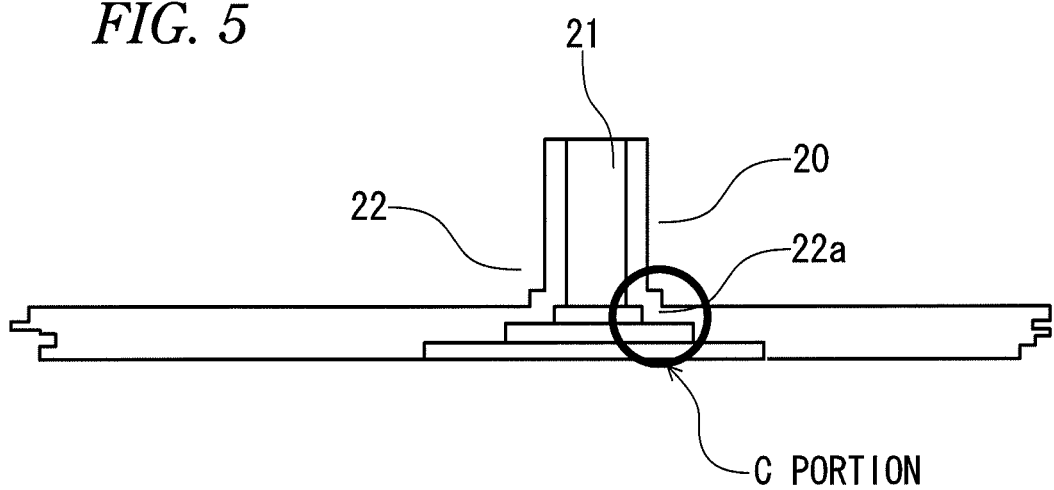
FIG. 5 is a cross sectional view of a shaft portion of a slider.
Figure 6:
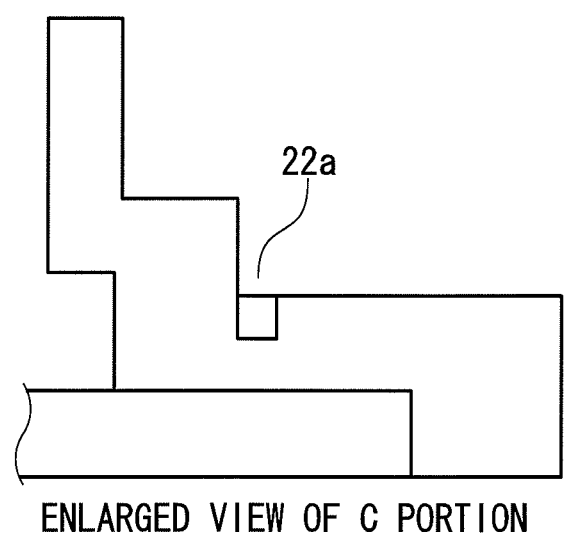
FIG. 6 is an enlarged view of the C portion in FIG. 5.
Figure 7:
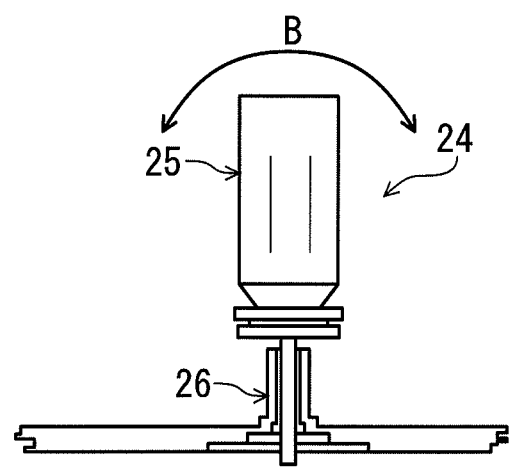
FIG. 7 is a schematic diagram illustrating a correction of an inclination of a shaft.

An embodiment of the present invention is described with reference to the drawings. FIG. 1 is a perspective view illustrating a rail of a slide device according to a first embodiment of the present invention. FIG. 2 is a side view of a rail in FIG. 1 seen from an A direction. FIG. 3 is a plan view of a slider. FIG. 4 is a cross sectional view of a slider taken along an X-X line in FIG. 3. FIG. 5 is a cross sectional view of a shaft portion of a slider. FIG. 6 is an enlarged view of FIG. 5. FIG. 7 is a schematic diagram illustrating a correction of an inclination of a shaft. First, an overview of a slide device is described.

In FIG. 1 to FIG. 4, a rail 1 has a substantially C shaped cross section, and includes a first travelling surface 2 of a bottom portion as an inner wall plane travelling while an outer ring 18 of a bearing rotates and a second travelling surface 3 arranged above the travelling surface 2. In addition, on the rail 1, a fixing hole 4 for fixing the rail 1 to a base (not illustrated) using screws or the like is arranged at approximately an equal interval in a longitudinal direction. As the rail 1 of the present embodiment, a ferrite-based stainless steel (SUS430), which has a good balance in strength, hardness and processing performance and a BA finish with a glossy surface grade, is used which has a plate thickness of 1.5 mm. Alternatively, a 2B finish of a semi-glossy surface grade is used. In order to produce a desired shape, cold working by a press is performed.

It is also possible to process using a press after roll forming a sheet of stainless steel. In dimensions of the rail outline, the width is approximately 20 mm, the height is approximately 10 mm and the length is approximately 250 mm. The length direction represents a travelling direction of a slider to be described later. The travelling direction is indicated by an arrow in the drawings. At a bottom portion of inner surface side of the rail 1, the first travelling surfaces 2a and 2b are provided left and right. In addition, along a wall perpendicular to the first travelling surfaces 2a and 2b, in parallel with the travelling direction, and above the first travelling surfaces 2a and 2b, a pair of the second travelling surfaces 3a and 3b left and right are arranged so as to form a constant angle with the first travelling surfaces 2a and 2b. A portion illustrated by a dotted line in the drawings is a surface of a portion coming into contact with an outer ring 18 of the bearing, which is processed to be hardened by cold working and the hardness becomes higher toward the surface. When producing a desired shape using a press, the rail is sufficiently pressed by a die or processed to be hardened by performing a minimized R of bending.

In addition, by roller burnishing method or the like, it is also possible to improve a surface roughness and simultaneously realize an increase in hardness. To increase the hardness of the surface with respect to a base material (substrate) and decrease the hardness from the travelling surface to the plate thickness direction, an inclination is adapted.

Next, a slider linearly guided to the rail 1 is described. FIG. 3 is a plan view of a slider 10. The slider 10 has six bearings 11a, 11b, 11b, 12a, 12a and 12b attached to a base 15 which is made of metal sheet and manufactured in desired shape. In addition, a fixing hole 16 is appropriately arranged in order to fix the slider 10 to a base of a moving body (not illustrated) using screws or the like. The base 15 in the present embodiment is a cold rolled steel sheet (SPCC), with thickness of 1.6 mm and the surface is plated with electroless nickel. In addition, the bearing is a deep groove type of ball bearing which has an inner diameter (d) $\phi 4$ mm, an outer diameter (D) of $\phi 7$ mm, and a width (B) of 2 mm. In this embodiment, an inner ring 17, an outer ring 18 and ball 19 of rolling elements are made of martensitic stainless steel (equivalent to SUS440C) and have a desired hardness through heat treatment such as hardening and tempering. For the ball, high carbon chromium steel (SUJ2) or ceramic with lower density may also be appropriately used.

The three bearings 11a, 11b and 11b correspond to the travelling surfaces 2a and 2b of the bottom portion of the rail 1, and the other three bearings 12a, 12a and 12b correspond to the second travelling surfaces 3a and 3b. These enable the respective bearings of the slider 10 to be guided to an inner surface of the inner wall of the rail 1 and to travel stably with respect to the corresponding travelling surface.

In FIG. 4 to FIG. 6, the base 15 is provided with a shaft 20 which is to be press fitted with respect to an inner ring 17 of the bearing 11b and arranged integrally by deep drawing in a desired dimension and direction. The shaft 20 is cylindrical, has the outer diameter of $\phi 4$ mm and a through hole 21 of approximately $\phi 3.2$ mm is provided at a center. A length of a straight portion of the shaft 20 is approximately 2.3 mm and, compared to a tip end portion, the thickness of a bottom portion 22 close to the base 15 is shallower (thickness slimming). Thus, plastic deformation easily occurs. When necessary, in order to easily generate stress concentration, a stress concentration portion 22a which has a notch shape, a wedge shape or the like may be added to the bottom portion 22. In addition, compared to an inner ring 17 of the bearing 11b, the shaft 20 has a shallow thickness so as to lower rigidity in a radial direction. Thus, even if the shaft 20 is press fitted to the inner ring 17 of the bearing 11b, the deformation of a raceway groove 17a of the inner ring 17 of the bearing 11b may be prevented. As a result, the raceway groove 17a provided in the inner ring 17 of the bearing 11b may be assembled while maintaining a high precision and thereby may be rotated stably with a low load (torque). Thus, a slide device with high reliability may be realized. Another bearing and shaft of the slider 10 also have the same configuration.

Next, a correction of an inclination of the shaft is described with reference to FIG. 7. The shaft 20 arranged at the slider 10 by drawing, through the bearing, held to the slider 10 capable of sliding with a desired precision with respect to the rail 1. Therefore, an angle precision with respect to the rail 1 is specifically important. With respect to the through hole 21 of the shaft 20 arranged at the base 15, another insertable shaft 26 is arranged at one end. To the other end, using a correction jig 24 similar to the shape of a driver which has a handle 25, the insertable shaft 26 is inserted with respect to the through hole 21 of the shaft 20. By bringing down the handle 25 of the correction jig 24 in a B direction illustrated in the drawing (left and right direction in the drawing), a stress capable of plastic deformation may be applied to the bottom portion 22 of the shaft 20. As described above, by allowing the bottom portion 22 of the shaft 20 to have a shallower thickness, the plastic deformation is designed to occur more easily, compared to the tip end portion. Furthermore, a large stress is generated at the bottom portion 22 due to the configuration of cantilevered beams and the plastic deformation is applied, whereby the inclination of the shaft 20 being easily corrected. In addition, since the shaft 20 is easily subject to plastic deformation, it is possible to reduce a distortion or residual stress with respect to the other portions of the slider 10. In addition, with regard to the correcting direction, it may be easily acknowledged that without limiting to the B direction, a correction in a direction perpendicular to the B direction or in any optional direction for correction may be performed. In the correction of the inclination, without chucking the outer diameter portion of the shaft 20 which is press fitted to the inner ring 17 of the bearing, the correction of the inclination may be performed and thereby no scratch is allowed to the outer diameter of the shaft. This also prevents an influence applied with respect to the press fitting of the bearing. In addition, it is easily understood that the correction jig 24 may also be inserted from the base 15 side in contrast to FIG. 7.

As above, the correction of the inclination of the shaft 20 at the slider single body is described. However, it is easily understood that the inclination of the shaft 20 may be corrected in the same manner even after assembling the bearing to the slider. Even better, even in a case of a form which has resins or rubbers added to an outer periphery of the bearing, the inclination of the shaft may be certainly corrected and further no scratch is allowed to the outer peripheral surface of the roller or the like coming into contact with the rail. Even in a case of the slider single body and even after the assembly, the inclination of the shaft may be corrected. Accordingly, yield in a process may be improved, disposal of parts may be prevented and thereby production cost may be saved.

In addition, since the shaft is produced integrally by drawing as understood from an aspect of the present embodiment, the number of parts may be reduced and the reliability may be improved.

Furthermore, even in fluctuations of the rail or the slider, by applying the aspect of the present embodiment, with respect to a desired precision, a combination of the rail with the slider, and the correction of the inclination may be realized and the yield may be improved.

Hitherto, even described, it is obvious that also in the relation between the shaft and the bearing, applications are also clearly available with respect to a form of rotating the outer ring in a small gap or a form where the inner ring and the shaft are bonded and fixed. In this case, without deforming the raceway groove of the inner ring, peeling off of adhesion may be prevented. In addition, in order to prevent falling out of the bearing in a thrust direction, separate members may be fixed to the through hole by press fitting or bonding. In addition, it is obvious that crushing the tip end portion of the through hole or extending may be applied so as to prevent desorption of the bearing in the thrust direction.

Second Embodiment

Figure 8:
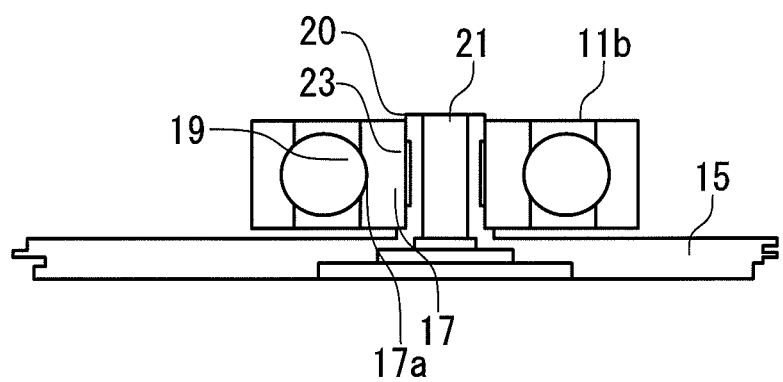
FIG. 8 is a cross sectional view of a slider according to a second embodiment of the present invention.

Next, a second embodiment of the present invention is described with reference to FIG. 8. The present embodiment is different from the first embodiment only in the configuration of the shaft 20. Thus, a configuration of the shaft 20 is described in detail and the same portion as the first embodiment is omitted in description with the same reference numeral.

In the present embodiment, a thickness slimming portion 23 is formed by slimming down an outer diameter portion corresponding to a raceway groove 17a of the inner ring 17 of the bearing 11b, in a straight portion of the shaft 20. Compared to the inner ring 17 of the bearing 11b, rigidity in a radial direction of the shaft 20 is designed to be lower. Thus, even when the shaft 20 is press fitted to the inner ring 17 of the bearing 11b, a deformation of a raceway groove 17a to be arranged at the inner ring of the bearing 11b may be prevented. In this manner, the raceway groove 17a of the bearing 11a may have a smaller deformation and may be stably rotated with lower load (torque). Accordingly, a slide device with high reliability may be realized. In addition, even without lowering a rigidity of the shaft 20, compared to the inner ring 17 of the bearing 11b, it is obvious that the rigidity of the shaft 20 may be good enough if the rigidity of a portion corresponding to the raceway groove 17a is set to be lower. The other bearing and shaft of the slider 10 have the same configuration.

According to an aspect of the present embodiment, since a portion corresponding to the raceway groove 17a, with rigidity in the radial direction of the shaft 20, is lowered in rigidity, compared to the other portions. Thus, when being press fitted to the inner ring 17 of the bearing, a deformation with respect to the raceway groove 17a of the inner ring 17 may be reduced. In addition, even in a management of interference fitting between the shaft 20 and the inner ring 17, an influence of the deformation may be reduced with respect to the raceway groove 17a of the inner ring 17. Thus, the management may become easier and thereby a slide device with a low load and high reliability may be realized.

Figure 10:
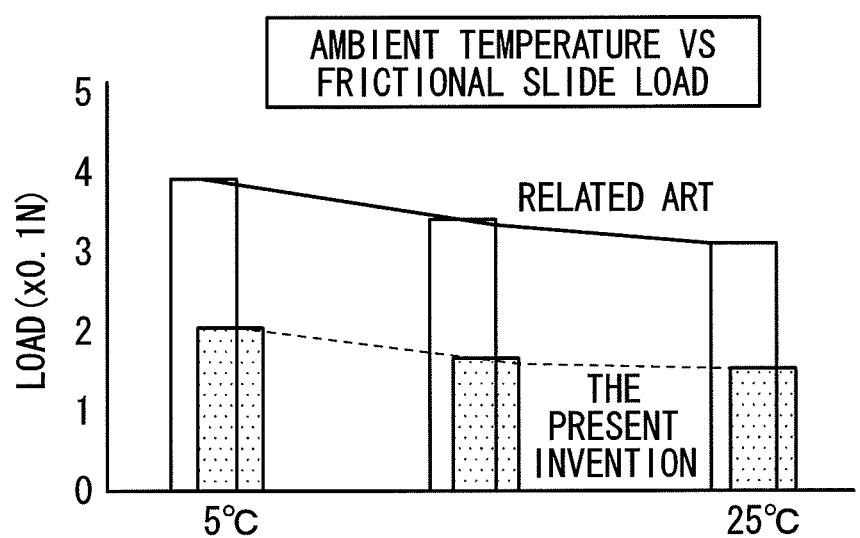
FIG. 10 is a characteristic diagram illustrating a frictional slide load of a slide device according to a second embodiment of the present invention.

FIG. 10 is a characteristic diagram illustrating characteristics of frictional slide loads at each temperature of a slide device according to an aspect of the present embodiment. Compared to the characteristics of the slide device in the related art, a reduction of the frictional slide load may be realized at each temperature. In addition, it may be understood that a size of fluctuations in the frictional slide load depending on the temperature also becomes small. This is considered because fluctuations due to a difference in temperature expansion coefficient between the shaft 20 and the inner ring 17 of the bearing allows a rigidity in the radial direction of the shaft 20 to be lower and thereby compared to the slide device in the related art, a deformation of the raceway groove 17a may be more certainly reduced.

In addition, a life test of this type of slide device confirms that a device with smaller frictional slide load has longer lifetime. It is considered that a less deformation of the raceway groove 17a leads to less decrease of an inner gap of the bearing and less increase of a torque. Furthermore, it is also considered that the less deformation of the raceway groove 17a suppresses heat generation under the similar use condition and also prevents a thermal degradation of lubricant.

Third Embodiment

Figure 9A:
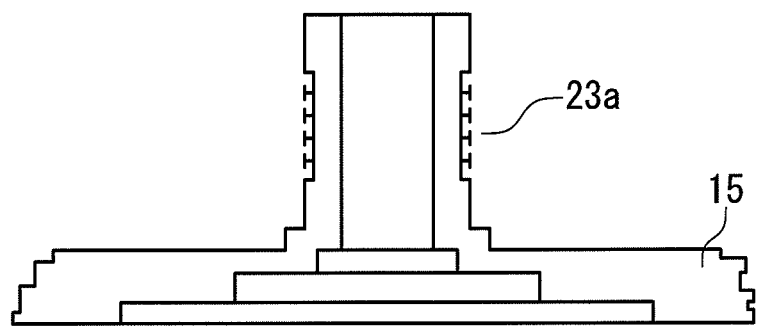
FIG. 9A is a cross sectional view of a main portion of a shaft of a slider according a third embodiment of the present invention.

Next, a third embodiment of the present invention is described with reference to FIG. 9A. The present embodiment is different from the first embodiment only in the configuration of the shaft 20. Thus, a configuration of the shaft 20 is described in detail and the same portion as the first embodiment is omitted in description with the same reference numeral.

According to the embodiment, in a straight portion of the shaft 20, at a portion corresponding to the raceway groove 17a of the inner ring 17 of the bearing, there are provided a plurality of annular grooves 23a on an outer peripheral surface of the shaft and rigidity in a radial direction of the shaft 20 is lowered. The same operation as the thickness slimming of the second embodiment is adapted. In the annular groove 23a, a single or a plurality of spiral grooves may be also configured. The operation is the same as the second embodiment and thereby the description is omitted. However, in the third embodiment, by changing a space, a width or further a depth of the groove 23a, a partial and appropriate change in an effect of the thickness slimming may be easily performed. In other words, an appropriate and easy change of rigidity according to the longitudinal direction of the shaft 20 may be also performed.

In addition, according to the second and third embodiment, by applying an adhesive to the thickness slimming portion or the groove portion of the shaft 20, the fixing with the inner ring 17 of the bearing may be more strengthened.

Fourth Embodiment

Figure 9B:
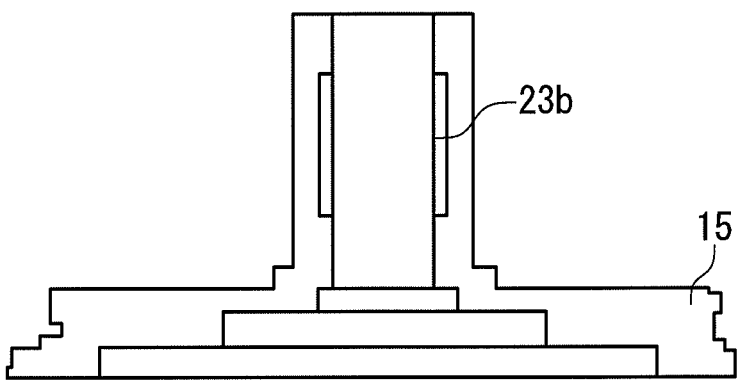
FIG. 9B is a cross sectional view of a main portion of a shaft of a slider according a fourth embodiment of the present invention.

Next, a fourth embodiment of the present invention is described with reference to FIG. 9B. The present embodiment is different from the first embodiment only in the configuration of the shaft 20. Thus, a configuration of the shaft 20 is described in detail and the same portion as the first embodiment is omitted in description with the same reference numeral.

According to the embodiment, in a straight portion of the shaft 20, by slimming down an inner diameter portion of the shaft 20, a thickness slimming portion 23b is formed. An aspect of the embodiment has the same effect as the above described second and third embodiments. In addition, in the present embodiment, an outer diameter of the shaft 20 is uniform and thereby a handling work in such a case as a post finishing process of the outer diameter or the like is convenient since it is treated as a normal shaft.

Fifth Embodiment

Figure 9C:
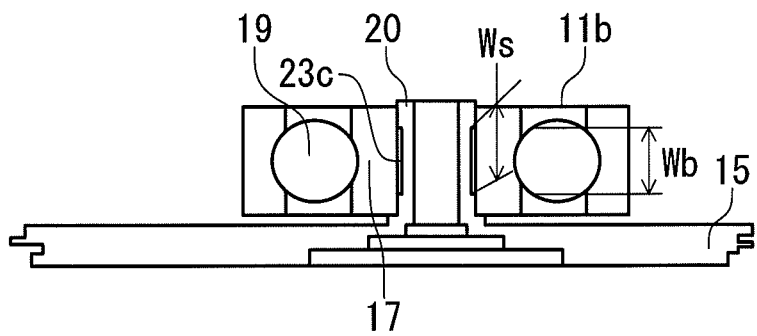
FIG. 9C is a cross sectional view of a main portion of a shaft of a slider according a fifth embodiment of the present invention.

Next, a fifth embodiment of the present invention is described with reference to FIG. 9C. The present embodiment is different from the first embodiment only in the configuration of the shaft 20. Thus, a configuration of the shaft 20 is described in detail and the same portion as the first embodiment is omitted in description with the same reference numeral.

According to the present embodiment, in a straight portion of the shaft 20, with respect to a width dimension Wb of the raceway groove 17a of the inner ring 17 of the bearing 11b, at an outer diameter portion of the shaft 20, an undercut 23c with a width Ws without being in contact with the inner ring 17 is arranged. A relation between the width dimension Wb of the raceway groove 17a and the width dimension Ws of the undercut 23c which has the width without being in contact with the inner ring 17, as Wb≤Ws, may certainly prevent a deformation of the raceway groove 17a. In addition, the undercut 23c without being in contact with the inner ring 17 may be configured in the same manner as the third embodiment. The undercut 23c declining rigidity is described, but it is obvious that by applying the similar relation as a width of the thickness slimming, a deformation of the raceway groove 17a may be also prevented.

It is obvious that the thickness slimming, the groove, the undercut or the like described above may be performed independently or in combination. In addition, the present invention is not limited to these embodiments, and may be appropriately modified.

INDUSTRIAL APPLICABILITY

A slide device of the first aspect of the invention may correct an inclination of a shaft without chucking an outer diameter of the shaft by arranging a through hole at the shaft of the slider on which the bearing is mounted. Accordingly, a slide device with high yield, low cost and high reliability may be provided and may be useful for an application to an expensive linear guide or the like.

In addition, a slide device of the second aspect of the invention has a low rigidity of portion with respect to the raceway groove of the inner ring of the bearing on the shaft of the slider on which the bearing is mounted and thereby a deformation of the raceway groove of the inner ring may be reduced. Accordingly, a slide device with low frictional slide load and high reliability may be provided.

In addition, the present application is based on Japanese Patent Application No. 2010-126012 filed Jun. 1, 2010, the contents of which are incorporated herein by reference.

REFERENCE SIGNS LIST 1 rail
2, 2a, 2b first travelling surface
3, 3a, 3b second travelling surface
4 fixing hole
10 slider
11a, 11b bearing
12a, 12b bearing
15 base
16 fixing hole
17 inner ring
17a raceway groove
18 outer ring
19 ball
20 shaft
21 through hole
22 bottom portion
22a stress concentration portion
23 thickness slimming portion
23a groove
23b thickness slimming portion
23c undercut
24 correction jig
25 handle
26 shaft

The invention claimed is:

1. A slide device comprising:
a rail whose cross-section is substantially C-shaped; and
a bearing arranged to face an inner wall plane of the rail and configured such that an outer ring of the bearing is rotated,
wherein the rail guides a slider supporting an inner ring of the bearing such that the slider is moved linearly, and
wherein a shaft of the slider is configured to support the inner ring of the bearing and is formed integrally with the slider, and a through hole is formed in a center of the shaft,
a notch is formed in a bottom portion of the shaft close to the slider such that the bottom portion of the shaft is configured to be subjected to plastic deformation.

2. The slide device according to claim 1, wherein the shaft is formed at the slider by drawing.

3. The slide device according to claim 1,
wherein rigidity of the shaft is lower than that of the inner ring of the bearing in a radial direction so as to prevent deformation of a raceway groove of the inner ring into which the shaft is press fitted.

4. The slide device according to claim 3, wherein the shaft is formed at the slider by drawing.

5. A slide device comprising:

a rail whose cross-section is substantially C-shaped; and a bearing arranged to face an inner wall plane of the rail and configured such that on outer ring of the bearing is rotated, wherein the inner wall plane of the rail guides a slider supporting an inner ring of the bearing such that the slider is moved linearly, and wherein a shaft of the slider is configured to support the inner ring of the bearing, and rigidity of a portion of the shaft facing a raceway groove of the inner ring of the bearing is reduced, wherein an outer diameter portion of the shaft, corresponding to the raceway groove of the inner ring, has a thickness in a diameter direction which is smaller than a thickness in the diameter direction of an adjacent portion of the shaft.

6. The slide device according to claim 5, wherein an undercut is formed in a portion of the shaft facing the raceway groove of the inner ring of the bearing, and the undercut is not in contact with the raceway groove.

7. The slide device according to claim 6, wherein a width of the undercut or a thickness of the slimmed portion of the shaft is equal to or wider than a width of the raceway groove of the inner ring of the bearing.

* * * * *